Patented Oct. 24, 1944

2,361,009

UNITED STATES PATENT OFFICE 2,361,009

PRINTING INKS

Everett F. Carman, Rutherford, N. J., and Whitney H. Mears, New York, N. Y., assignors to Interchemical Corporation, New York, N. Y., a corporation of Ohio No Drawing. Application April 26, 1941, Serial No. 390,538

7 Claims. (Cl. 106—24)

This invention relates to printing ink, and has particular reference to a new type of ink characterized by the use therein of a prolamine dissolved in a partial ester of glycerol and acetic acid. Such inks are stable on the press and may be dried rapidly to give markings particularly useful in food wrappers.

The alcohol-soluble prolamine proteins (e. g. zein from corn, gliadin from wheat, etc.) are characterized by their insolubility in non-polar solvents and in water, in the absence of alkali, and by their solubility in water-miscible polar solvents and in mixtures thereof with water, within limits, to yield film-forming solutions. Such solutions have been suggested for use as varnishes, and as vehicles for coating compositions and printing inks. Their usefulness has been limited by the tendency of the films to absorb water and set up to gels on humid days so that films which must be worked (paints for brushing or roller coating, typographic printing inks, etc.) are often unworkable. The phenomenon is particularly noticeable in compositions containing water-insoluble resin admixed with the protein, and in typographic printing inks where solvents are used which are substantially non-volatile at 25° C., such as the higher glycols, the polyglycols, etc. As a result of this tendency, the usefulness of prolamines in typographic printing has been very limited, since no solvents were known which were non-volatile and yet would not give gelled films at relative humidities of the order of 60% or higher.

We have discovered that a press-stable typographic ink containing prolamine, if desired in admixture with resin, may be made by using as the vehicle a solution of prolamine in a partial ester of glycerol and acetic acid. These solvents (mono-acetin and diacetin, and mixtures thereof) are substantially non-volatile at ordinary temperatures, and while the solvents are water-miscible, the inks do not gel on the distribution rollers when printing is done at high relative humidities.

Where printing is to be done on any but soft stocks, we prefer to use a minor proportion of a resin in admixture with the prolamine; and where very hard stocks are to be printed, we have found that a highly acid resin, or a resin in admixture with a fatty acid, markedly increases the printability of the ink. Materials of acid number (milligrams KOH to neutralize a gram of material) of 100 or more are most desirable for this purpose.

The inks made according to our invention are press stable and print well. They may be set by heating the ink film to remove the solvent, or by spraying with water, which sets the film to an irreversible gel. The resultant film, no matter how set, is insoluble in water, and will withstand coating with molten paraffin wax; the vehicle has little odor, and is non-toxic. All these properties are particularly useful in the production of food wrappers, and have not hitherto been available to such a degree in any one ink.

Typical examples of our invention are the following:

Example 1

55.10 parts by weight varnish, comprising
    4.0 parts by weight rezyl 10 (benzoic acid modified glycerol phthalate resin)
    4.0 parts by weight lauric acid
    20.0 parts by weight alcohol-soluble zein (corn prolamine)
    72.0 parts by weight diacetin
18.30 parts by weight titanium dioxide
5.50 parts by weight blue toner
1.83 parts by weight copper phthalocyanuine blue
1.83 parts by weight alkali blue
.94 part by weight lecithin
16.50 parts by weight diacetin This is a stable ink which prints well on hard carton stocks. It can be printed at humidities substantially above 60% without gelation on the press, and can be set on the paper by heat or water precipitation.

Example 2

A similar ink was made, using the varnish of Example 1, but replacing the lauric acid with the resinous reaction product of terpinene and maleic anhydride having an acid number of 500. This ink contained—

| | Parts by weight |
|---|---|
| Varnish | 53.50 |
| Lithol toner | 24.90 |
| Titanium dioxide | 1.60 |
| Alumina hydrate | 2.10 |
| Diacetin | 16.80 |
| Lecithin | 1.10 |

This ink also printed well.

Example 3

49.00 parts by weight varnish, comprising
    20 parts by weight zein (corn prolamine)
    80 parts by weight diacetin
31.82 parts by weight titanium dioxide
2.90 parts by weight alkali blue
4.90 parts by weight blue toner
.99 part by weight lecithin
.49 part by weight Essowax (paraffin wax)

Example 4—Black ink 58.50 parts by weight varnish, comprising
    20 parts by weight zein (corn prolamine)
    80 parts by weight mono-acetin
19.50 parts by weight mono-acetin
19.50 parts by weight carbon black
2.50 parts by weight vultamol (aromatic ester sulfonate) and diethylene glycol—1:1

*Example 5—Blue ink*

| | Parts by weight |
|---|---|
| Varnish of Example 4 | 68.88 |
| Mono-acetin | 7.84 |
| Titanium dioxide | 11.56 |
| Saffire blue toner | 5.88 |
| Phthalocyanine blue | 1.98 |
| Alkali blue | 1.98 |
| Santomerse D (alkyl aryl sulfonate) | 1.98 |

Examples of these inks can, of course, be multiplied indefinitely without departing from the scope of the invention, which is defined in the claims. In particular, other prolamines can be substituted for zein, and other pigments can be used. Various resins which are soluble in mono- and diacetin can be used, including natural resins such as rosin, and the mono- and diacetin-soluble synthetic resins of various sorts, including alkyd resins, resins obtained by the diene synthesis, etc. Any of the higher fatty acids soluble in mono- and diacetin may be used to replace lauric acid.

This application is a continuation-in-part of our co-pending application Serial Number 363,910, filed November 1, 1940.

We claim:

1. A typographic printing ink vehicle stable on the inking system of a typographic printing press at humidities above 60%, comprising a solution of a prolamine in a solvent consisting of a partial ester of glycerol and acetic acid.

2. A typographic printing ink vehicle stable on the inking system of a typographic printing press at humidities above 60%, comprising a solution of a prolamine in a solvent consisting of monoacetin.

3. A typographic printing ink vehicle stable on the inking system of a typographic printing press at humidities above 60%, comprising a solution of a prolamine in a solvent consisting of diacetin.

4. A typographic printing ink vehicle stable on the inking system of a typographic printing press at humidities above 60%, comprising a solution of alcohol-soluble zein in a solvent consisting of diacetin.

5. A typographic printing ink vehicle stable on the inking system of a typographic printing press at humidities above 60%, comprising a solution of alcohol-soluble zein in a solvent consisting of diacetin, and a minor proportion of a resin compatible therewith.

6. A typographic printing ink vehicle stable on the inking system of a typographic printing press at humidities above 60%, comprising a solution of alcohol-soluble zein in a solvent consisting of diacetin, and a minor proportion of a resin compatible therewith and having an acid number of at least 100.

7. A typographic printing ink stable on the inking system of a typographic printing press at humidities above 60%, comprising pigment dispersed in a vehicle comprising zein dissolved in a solvent consisting of a partial ester of glycerol and acetic acid.

EVERETT F. CARMAN.
WHITNEY H. MEARS.